Sept. 8, 1964  C. SCHNELL  3,147,785
SELF-ADJUSTING BLADE FOR COMMINUTING MACHINE
Filed April 25, 1961
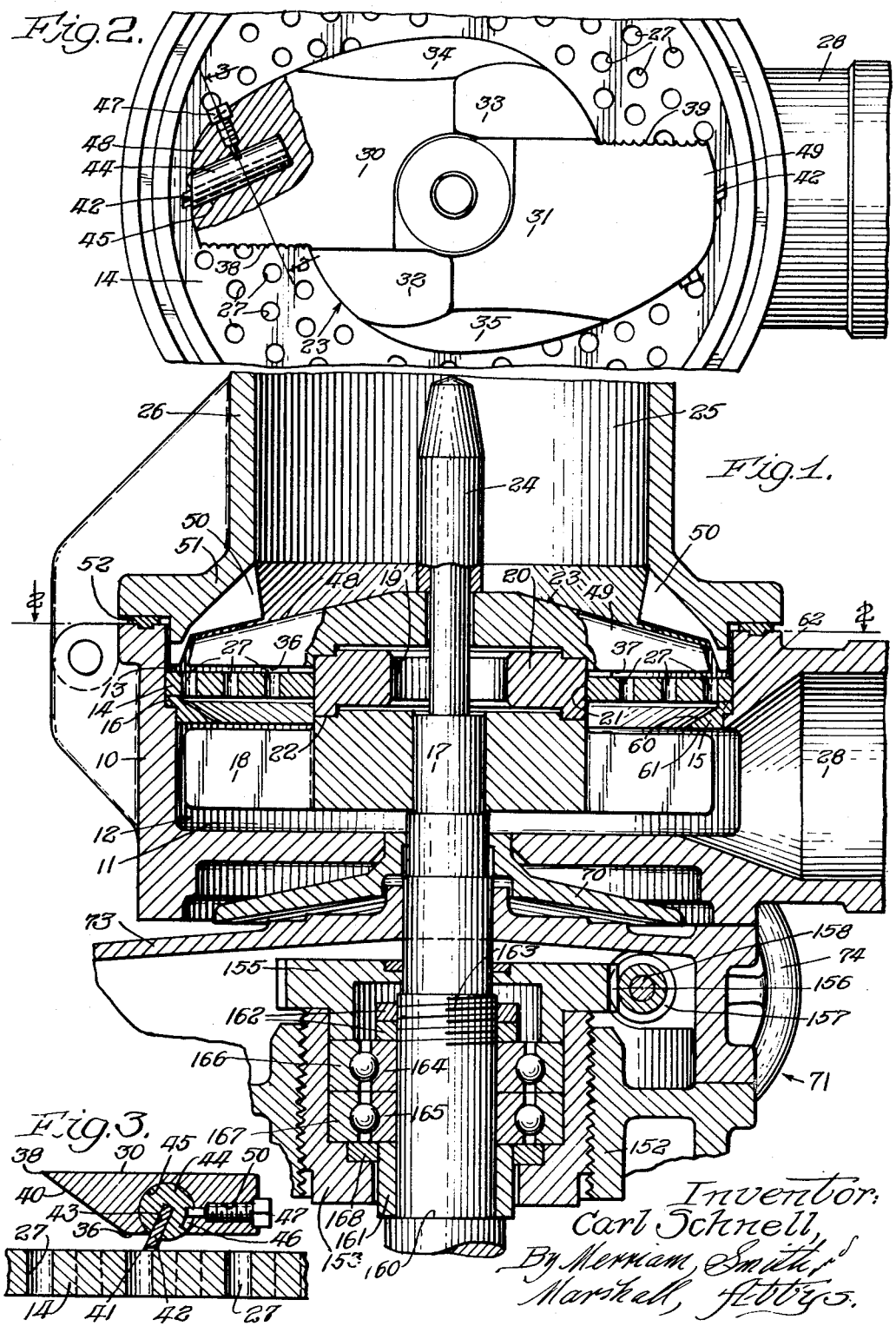
Inventor:
Carl Schnell,
By Merriam, Smith &
Marshall, Attys.

United States Patent Office 3,147,785
Patented Sept. 8, 1964

3,147,785
SELF-ADJUSTING BLADE FOR COMMINUTING MACHINE
Carl Schnell, Winterbach, near Schorndorf-Wurttemberg, Germany, assignor of one-half to The Griffith Laboratories, Inc., Chicago, Ill., a corporation of Illinois
Filed Apr. 25, 1961, Ser. No. 105,469
Claims priority, application Germany Nov. 4, 1960
12 Claims. (Cl. 146—192)

The present invention relates generally to comminuting machines and more particularly to a comminuting machine including a cutting blade which is self-adjusting to offset wear on the knife edge of the blade, and which positions itself in correct alignment with replacements for worn out co-acting parts.

Comminuting machines are useful for comminuting many materials, especially agricultural and animal products such as meat emulsions for preparing sausages and the like. These machines generally include a supply chamber into which material to be comminuted is introduced, a comminuting chamber in communication with the supply chamber and in which the material is comminuted, and a discharge chamber in communication with the comminuting chamber, and into which the comminuted material passes incident to ejection from the machine. In the comminuting chamber the comminution of the material is performed, in part, by a knife blade having a cutting edge which skims along the surface of an adjacent perforate plate. Comestible material is fed into the comminuting chamber where it is comminuted and is then forced through holes in the perforate plate. To obtain the desired comminuting effect it is important that this knife edge be maintained in substantially abutting relation to the adjacent surface of the perforate plate. As the abutting cutting edge continues to skim along the adjacent surface of the perforate plate, both parts wear away, thereby creating a gap between the previously abutting cutting edge and plate. It then becomes necessary to adjust the blade so that the worn cutting edge is once again in the desired abutting relation with respect to the worn perforate plate. Heretofore, this operation has required complex adjusting mechanisms which entail substantial expense or has necessitated a shutting down of the machine during the period of adjustment, or both.

The present invention eliminates the disadvantages of the prior art in that the blade having the knife edge which is susceptible to wear is self-adjusting so that the cutting edge is always maintained in substantially abutting relation with respect to the perforate plate.

Other features and advantages are inherent in the structure claimed and disclosed, as will become apparent to those skilled in the art from the following detailed description in conjunction with the accompanying drawings wherein:

FIGURE 1 is a sectional view of an embodiment of a comminuting machine constructed in accordance with the subject invention;

FIGURE 2 is a sectional view taken along line 2—2 in FIGURE 1; and

FIGURE 3 is a sectional view taken along line 3—3 in FIGURE 2.

A comminuting machine constructed in accordance with the subject invention may have an external appearance typified by that shown in Schnell U.S. Patent No. 2,934,121 issued April 26, 1960.

Referring to FIGURE 1, there is shown a typical embodiment of a comminuting machine constructed in accordance with the subject invention. More specifically, the machine comprises housing wall means 10 extending from transverse wall means 11 together defining a discharge chamber 12 communicating with a comminuting chamber 13, also defined by housing wall means 10 and separated from discharge chamber 12 by a perforate plate 14 resting atop a suction member or venturi ring 15 supported on a shoulder or ledge means 16 of wall means 10. Extending axially through chambers 12 and 13 is a driven shaft 17 powered by motor means (not shown) and rotatably mounting a centrifugal discharge or ejector rotor 18 located in chamber 12. Shaft 17 also extends axially through an opening 19 in a rotor plate 20 located within an opening 21 in perforate plate 20 and having a peripheral lip 22 which rests atop discharge rotor 18. Rotor plate 20 in turn supports a propelling cutting rotor 23 located in comminuting chamber 13. Shaft 17 terminates in a threaded end (not shown) upon which is screwed a cap 24 which bears down against an adjacent surface of cutting rotor 23 and clamps rotor 23, rotor plate 20, and discharge rotor 18 together for simultaneous rotation when shaft 17 is driven by the motive means of the machine.

Comminuting chamber 13 is in communication with an inlet or supply chamber 25 defined by wall means 26. Material to be comminuted is fed initially into chamber 25 from which it flows into chamber 13 where it is comminuted and forced through holes 27 in perforate plate 14 into discharge chamber 12 from which the comminuted material is ejected by discharge rotor 18 outwardly through tangential discharge outlet 28 communicating with the discharge chamber.

The embodiment of rotor 23 shown in the drawings includes two hydrodynamically balanced rotor arms 48, 49. As shown in FIGURE 2, each rotor arm has a surface adjacent inlet chamber 25, said surfaces including respective main surface portions 30, 31, intermediate surface portions 32, 33, and peripheral surface portions 34, 35, all of said surface portions sloping outwardly away from feed chamber 25. Each rotor arm has a flat surface 36, 37, respectively, adjacent perforate plate 14 and spaced therefrom.

As shown in FIGURES 2 and 3, each arm includes a serrated cutting edge 38, 39 constituting the leading edge of its cutting arm when the rotor is rotated in a counter-clockwise sense (as viewed in FIGURE 2) by the normal rotation of drive shaft 17. As shown in FIGURE 3, which depicts arm 48, leading cutting edge 38 constitutes one edge of a face 40 sloping toward perforate plate 14 in a direction opposite the direction of rotation, and terminating at flat rotor arm surface 36. As rotor 23 turns, comestible material is further comminuted by a trailing cutting edge 41 disposed in abutting relation to plate 14 and which skims along the adjacent surface of perforate plate 14.

More specifically, cutting edge 41 constitutes the end of a blade 42 fixed in a slot 43 in a shaft 44 rotatably mounted in a bore 45 extending into the rotor arm. The axis of the bore extends substantially parallel to plate 14 and in a direction as illustrated in FIGURE 2 (e.g. at an acute angle to leading cutting edge 38). The perpendicular distance between plate 41 and the closest point on the peripheral surface of shaft 44 is less than the width of that portion of blade 42 which extends width-wise outwardly through the peripheral surface of shaft 44 toward plate 14. Consequently, blade 42 is normally inclined toward plate 14 in the direction of leading cutting edge 38. As the rotor turns and cutting edge 41 skims along the adjacent surface of plate 14, there is a tendency for edge 41 and plate 14 to wear away, thereby creating an undesirable gap between the two. As this occurs, gravity urges blade 42 and shaft 44 in a counter-clockwise sense (as viewed in FIGURE 3) thereby rotating the blade 42 to a new angularly extending position in abutment with plate 14. In this manner cutting edge 41 is always positioned in substantially abutting relation to plate 14 so that the edge will continue to skim along the adjacent surface of plate 14.

Thus, blade 42 is mounted for pivotal movement, about an axis angular to the axis of rotor 23 and shaft 24, toward and away from both leading edge 38 and plate 14 and is normally urged, by gravity, toward plate 12. In other words, plate 42 is mounted for movement from the position of FIGURE 3 to a position in which the spacing between cutting edge 41 and leading edge 38 is greater, in both horizontal and vertical directions, than the spacing between these edges when a blade of equal width is in the position of FIGURE 3.

Shaft 44 includes a peripheral groove 46 for receiving a pin 47 extending through a second bore 50 in the rotor arm, bore 50 extending transversely to bore 45. The function of pin 47 is to prevent axial displacement of shaft 44 in bore 45 and also to serve as a stop whereby rotation of shaft 44 and blade 43 in a counter-clockwise sense, as viewed in FIGURE 3, is terminated when blade 42 is disposed perpendicularly to plate 14.

The above-described structure for automatically adjusting the blade to offset edge wear, also enables the cutting blade to arrange itself in the desired location relative to a perforate plate 14 when the latter constitutes a replacement for a previous perforate plate that has worn out. More specifically, a new perforate plate will tend to be thicker than the worn out perforate plate which it has replaced. Accordingly, the angle at which blade 42 extends in the direction of the leading cutting edge will have to be greater than the angle which it was able to assume with a thinner worn-out perforate plate. This is readily obtained in the subject structure because the rotatable mounting for the knife blade automatically positions it in the desired abutting position, when the machine is reassembled.

Referring to FIGURE 1, the comminuting operation is aided by lugs 50 attached to a flared portion 51 of wall means 26, said flared portion 51 being connected to wall means 10 by an air-tight joint including seal means 52.

Venturi ring or annular suction member 15, which supports plate 14, comprises a pair of inwardly converging surfaces 60, 61. To prevent comminuted material from jamming between ring 15 and plate 14, ring surface 60, adjacent plate 14, slopes inwardly away from said plate. On the other hand, ring surface 61 extends inwardly substantially parallel to plate 14. Around the periphery of the ring is an integral flange 62 resting on shoulder 16 of wall means 10, and underlying plate 14. The outer peripheral surface of venturi ring 15 is in contact or abutment with the inner wall surface of discharge chamber 12 around the entire periphery of the discharge chamber. As shown in FIGURE 2, the inner diameter of ring 15 is substantially smaller than the inner diameter of discharge chamber 12, and less than the outer diameter of ejector 18. By thus narrowing the orifice at the inlet end of discharge chamber 12, the pressure within discharge chamber 12 is increased accordingly causing an increased flow of material through discharge chamber 12 and the rest of the comminuting machine. This increased flow in turn cuts down on the temperature of the comestible material flowing through the machine due to the shorter length of time spent by the material in the heating environment of the machine. A further advantage is a decrease in the power required to operate the comminuting machine.

The following table illustrates the practical advantages derived from incorporating a venturi ring constructed in accordance with the subject invention in a comminuting machine.

|  | Output, Lbs. per Minute | Temperature Rise of Comminuted Material, °F. | Power Required, H.P. |
| --- | --- | --- | --- |
| With ring | 181 | 21 | 86.6 |
| No ring | 143 | 30 | 89.7 |
| Do | 161 | 29 | 89.6 |

Referring again to FIGURE 1, located below transverse wall means 11 is a rotary canopy or flinger plate 70 mounted on shaft 17 and intended to protect mechanism situated below the flinger plate from the effects of liquids or the like which might drip or seep from discharge chamber 12. This mechanism may take the form of means for adjusting shaft 17 in an axial direction. Means of this sort is generally conventional in comminuting machines not having the self-adjusting knife blade described above, said conventional adjusting mechanism being used to perform the same function as the self-adjusting blade of the subject invention. In comminuting machines including this self-adjusting mechanism, it is not necessary to have the axially adjusting means 71 for blade adjusting purposes. However, if desired, this mechanism may be included to raise or lower the rotary ejector 18, the rotor 20, or the cutting and propelling rotor 23 for other purposes. Accordingly adjusting means 71 is shown herein but it can be dispensed with so far as blade adjusting purposes are concerned.

Situated below canopy 17 is a housing or wall means 73 having an inner collar portion 152 with an internally threaded opening concentric with shaft 17. A circular threaded box 153 is mounted in said opening. At the top of box 153 is secured a ring 155 having teeth 156 meshing with a worm gear 157 on a shaft 158 carrying a hand wheel 74. Vertical movement of box 153 moves shaft 17. Within box 153 is a double ball bearing structure having inner race portions 164, 165 rigid with shaft 17 and outer race portions 166, 167 rigid with box 153. Shaft 17 has a shoulder 160 on which rests a collar 161. Collar 161, together with locking nuts 162 on a threaded portion 163 of shaft 17 clamps inner races 164, 165 so that said races move with the shaft. Similarly, the outer stationary races 166 and 167 are secured in box 153 in part by the ring gear 150.

The foregoing detailed description has been given for clearness of understanding only, and no unnecessary limitations should be understood therefrom, as modifications will be obvious to those skilled in the art.

I claim:
1. In a comminuting chamber:
 a perforate plate defining one end of said chamber;
 a propelling, cutting rotor located adjacent said plate;
 means mounting said rotor for rotation about an axis perpendicular to said plate;
 said rotor including a leading cutting edge spaced from said plate;
 a blade having at least portions thereof trailing said leading edge, said blade normally extending from said rotor toward the plate in the direction of said leading edge, and terminating in a cutting edge normally abutting the adjacent surface of said plate;
 and means mounting said blade for pivotal movement about an axis substantially parallel to said plate and in a direction away from said leading edge.

2. In a comminuting chamber as recited in claim 1 wherein said blade-mounting means comprises:
 a first bore in said rotor extending axially parallel to said plate;
 a blade-mounting shaft slidably and rotatably received in said bore;

a longitudinal slit in said shaft fixedly mounting said blade;

and means normally preventing axial movement of said shaft and for limiting the rotation of said blade in a direction away from said leading edge to a rotated position in which the blade extends perpendicularly toward said plate.

3. In a comminuting chamber as recited in claim 2 wherein said last recited means comprises:

a circumferential slot in said blade-mounting shaft;

a second bore in said rotor, extending axially transversely to the axis of said first recited rotor bore, and communicating therewith, said second bore being aligned with said circumferential slot in said blade-mounting shaft when the latter is assembled in the first rotor bore and the knife blade is in its normally extending position;

and a pin extending through said second rotor bore and into said circumferential slot;

said pin engaging the trailing wall of said slot in the direction of rotation of the blade-mounting shaft when the blade is in said perpendicular position.

4. In a comminuting chamber as recited in claim 2 wherein said first bore in the rotor has a longitudinal open portion adjacent the plate, and said bore extends axially at an acute angle to the leading cutting edge of said rotor.

5. In a comminuting chamber as recited in claim 1, and comprising:

means normally urging said knife blade in the direction away from the leading cutting edge.

6. In a comminuting chamber as recited in claim 1 wherein said last recited axis extends at an acute angle relative to the leading cutting edge of said rotor.

7. In a comminuting chamber as recited in claim 1 and comprising means for limiting the rotation of said blade in a direction away from said leading edge to a rotated position in which the blade extends perpendicularly toward said plate.

8. In a comminuting chamber as recited in claim 7 wherein said limiting means includes means normally preventing axial movement of said blade.

9. In a comminuting chamber:

a perforate plate defining one end of said chamber;
a propelling, cutting rotor located adjacent said plate;
means mounting said rotor for rotation about an axis perpendicular to said plate;
said rotor including a leading cutting edge spaced from said plate;
a blade having at least portions thereof trailing said leading edge, said blade normally extending widthwise from said rotor toward the plate in the direction of said leading edge, and terminating in a cutting edge normally abutting the adjacent surface of said plate;

means mounting said blade and its cutting edge for pivotal movement, about an axis angular to the axis of said rotor, and toward and away from both said leading edge and said plate;

and means normally urging said blade away from said leading edge and toward said plate for automatically maintaining said cutting edge in abutting relation with said adjacent surface of said plate, notwithstanding wear on both the cutting edge and the adjacent plate surface.

10. In a comminuting chamber as recited in claim 9 wherein said last recited means is mounted on said rotor and is located between the rotor and the plate.

11. In a comminuting chamber as recited in claim 9 wherein said last recited means comprises gravity actuated means.

12. In a comminuting chamber:

a perforate plate defining one end of said chamber;
a propelling, cutting rotor located adjacent said plate;
means mounting said rotor for rotation about an axis perpendicular to said plate;
said rotor including a leading, cutting edge spaced from said plate;
a blade having at least portions thereof trailing said leading edge, said blade normally extending widthwise from said rotor toward the plate in the direction of said leading edge, and terminating in a cutting edge normally abutting the adjacent surface of said plate;

means mounting said blade for movement between a position in which the blade's cutting edge is spaced from the rotor's leading edge and another position in which the spacing between said cutting edge and said leading edge is greater, in both vertical and horizontal directions, than the spacing between said edges when a blade of equal width is in said first-recited position;

and means, normally urging said blade toward said other position, for maintaining said cutting edge in abutting relation with said adjacent surface of said blade, notwithstanding wear on both the cutting edge and the adjacent plate surface.

References Cited in the file of this patent

UNITED STATES PATENTS

| | | |
|---|---|---|
| 2,222,614 | Gronich | Nov. 26, 1940 |
| 2,977,056 | Gustke | Mar. 28, 1961 |

FOREIGN PATENTS

| | | |
|---|---|---|
| 392,503 | Germany | Mar. 28, 1924 |